Patented Nov. 20, 1951

2,575,457

UNITED STATES PATENT OFFICE 2,575,457

PREPARATION OF PHOSPHORIC ACID CATALYST ON A PRECALCINED SILICO-PHOSPHORIC ACID BASE

Julian M. Mavity, Hinsdale, Ill., assignor to Universal Oil Products Company, Chicago, Ill., a corporation of Delaware No Drawing. Application December 22, 1949,
Serial No. 134,587

7 Claims. (Cl. 252—935)

This invention relates to the manufacture of improved catalysts useful in accelerating various reactions of organic compounds. In a more specific sense, the invention is concerned with the production of a particular type of solid catalyst which has special properties both in regard to its activity in accelerating and directing olefin polymerization reactions, in its stability in service and in its relatively low corrosive properties when employed in ordinary commercial apparatus comprising various types of steel.

An object of this invention is a method of producing a hydrocarbon conversion catalyst having a high resistance to crushing during use.

Another object of this invention is the production of a highly active catalyst suitable for use in the polymerization of olefinic hydrocarbons and in other hydrocarbon conversion reactions involving olefins.

One specific embodiment of this invention relates to a process for manufacturing a solid catalyst which comprises mixing an oxygen acid of phosphorus with a siliceous adsorbent to form a composite, calcining said composite at a temperature above about 900° F. to form a solid calcined composite, impregnating said calcined composite with an oxygen acid of phosphorus to form a phosphoric acid coated composite, and calcining said phosphoric acid coated composite at a temperature below about 900° F. to form a structurally strong catalytic material having high hydrocarbon conversion activity.

A further embodiment of this invention relates to a process for manufacturing a solid catalyst which comprises mixing an oxygen acid of phosphorus with a siliceous adsorbent to form a composite, shaping said composite into particles, calcining said particles at a temperature above about 900° F. to form calcined particles, impregnating said calcined particles with an oxygen acid of phosphorus to form phosphoric acid coated particles and calcining said phosphoric acid coated particles at a temperature below about 900° F. to form structurally strong particles with high catalytic activity for promoting hydrocarbon conversion reactions.

An additional embodiment of this invention relates to a process for manufacturing a solid catalyst which comprises mixing a polyphosphoric acid and diatomaceous earth to form a composite, shaping said composite into particles, calcining said particles at a temperature above about 900° F. to form calcined particles, impregnating said calcined particles with an oxygen acid of phosphorus to form phosphoric acid coated particles and calcining said phosphoric acid coated particles at a temperature below about 900° F. to form structurally strong particles with high catalytic activity for promoting hydrocarbon conversion reactions.

The essential and active ingredient of solid catalysts which are manufactured by the present process is an oxygen acid of phosphorus preferably one in which the phosphorus has a valence of 5. The phosphoric acid may constitute from about 40% to about 80% of the catalytic mixture ultimately produced and in most cases is over 50% by weight thereof. Of the various acids of phosphorus, orthophosphoric acid ($H_3PO_4$) and pyrophosphoric acid ($H_4P_2O_7$) find general application in the primary mixtures, due mainly to their cheapness and to the readiness with which they may be procured although the invention is not restricted to their use but may employ any of the other acids of phosphorus insofar as they are adaptable. It is not intended to infer, however, that the different acids of phosphorus, which may be employed will produce catalysts which have identical effects upon any given reactions as each of the catalysts produced from different acids and by slightly varied procedure will exert its own characteristic action.

In using orthophosphoric acid as a primary ingredient, different concentrations of the aqueous solution may be employed from approximately 75 to 100% or acid containing some free phosphorus pentoxide may even be used. By this is meant that the ortho acid may contain a definite percentage of the pyro acid corresponding to the primary phase of dehydration of the orthophosphoric acid. Within these concentration ranges, the acids will be liquids of varying viscosities, and readily mixed with adsorbent materials.

Pyrophosphoric acid corresponding to the formula $H_4P_2O_7$ can be incorporated with siliceous adsorbents at temperatures somewhat above its melting point (142° F.) and the period of heating which is given to the pyro acid-adsorbent mixtures or to mixtures of other polyphosphoric acids and siliceous mixtures or to mixtures of other polyphosphoric acids and siliceous adsorbents may be different from that used when the ortho acid is employed.

Triphosphoric acid which may be represented by the formula $H_5P_3O_{10}$ may also be used as starting material for preparation of the catalysts of this invention. These catalytic compositions may also be prepared from the siliceous materials mentioned herein and a phosphoric acid mixture containing orthophosphoric, pyrophosphoric, triphosphoric, and other polyphosphoric acids.

Another acid of phosphorus which may be employed in the manufacture of composite catalysts according to the present invention is tetraphosphoric acid. It has the general formula $H_6P_4O_{13}$, which corresponds to the double oxide formula $3H_2O \cdot 2P_2O_5$, which in turn may be considered as the acid resulting when three molecules of water are lost by four molecules of orthophosphoric acid $H_3PO_4$. The tetraphosphoric acid may be manufactured by the gradual and controlled dehydration by heating of orthophosphoric acid or pyrophosphoric acid or by adding phosphorus pentoxide to these acids in proper amounts. When the latter procedure is followed, phosphoric anhydride is added gradually until it amounts to 520% by weight of the total water present. After a considerable period of standing at ordinary temperatures, the crystals of the tetraphosphoric acid separate from the viscous liquid and it is found that these crystals melt at approximately 93° F. and have a specific gravity of 1.1886, at a temperature of 60° F. However, it is unnecessary to crystallize the tetraphosphoric acid before employing it in the preparation of the solid catalyst inasmuch as the crude tetraphosphoric acid mixture may be incorporated with the siliceous adsorbent and other catalyst ingredient.

The materials which may be employed as adsorbents or carriers for acids of phosphorus are divided roughly into two classes. The first class comprises materials of predominantly siliceous character and includes diatomaceous earth, kieselguhr, and artificially prepared porous silica. The second class of materials which may be employed either alone or in conjunction with the first class comprises generally certain members of the class of aluminum silicates and includes such naturally occurring substances as various fuller's earths and clays such as bentonite, montmorillonite, acid treated clays and the like. Each adsorbent or supporting material which may be used will exert its own specific influence upon the net effectiveness of the catalyst composite which will not necessarily be identical with that of other members of the class.

The phosphoric acid and siliceous adsorbent mentioned above which are used in this catalyst preparation are mixed preferably by adding the siliceous material to the phosphoric acid with stirring while the phosphoric acid is generally maintained at a temperature of from about 50 to about 450° F. and preferably at a temperature of from about 200° to about 350° F. In producing this mixture of a phosphoric acid and siliceous adsorbent, from about 25 to about 75% by weight of an oxygen acid of phosphorus is mixed with from about 75 to about 25% by weight of the siliceous adsorbent such as diatomaceous earth, kieselguhr, artificially prepared porous silica and the like.

The composite of the phosphoric acid and siliceous adsorbent is a slightly moist to almost dry material which, upon being compressed, becomes sufficiently plastic that it may be formed into shaped particles by extrusion or by other suitable means and the resultant particles are then dried at a temperature of from about 200° to about 500° F. and calcined further at a temperature of from about 900° to about 1100° F. for a time of from about 1 to about 20 hours and preferably for a time of from about 1 to about 10 hours.

The resultant calcined material is then mixed with an additional quantity of an oxygen acid of phosphorus so as to impregnate and coat the calcined particles with from about 5 to about 50% of their weight of said oxygen acid of phosphorus and form a phosphoric acid coated composite. The resultant phosphoric acid coated composite is generally in the form of granular or extruded particles which are then dried and calcined further at a temperature of from about 500° to about 900° F. to form a structurally strong material with high activity as catalyst for promoting hydrocarbon conversion reactions and particularly for promoting conversion reactions involving olefinic hydrocarbons.

This method of producing solid catalysts results in the formation of a material having high structural strength and superior activity for promoting hydrocarbon conversion reactions and particularly for promoting reactions involving olefinic hydrocarbons. The high temperature calcination step in the first of the process produces a primary composite of high structural strength but with relatively low hydrocarbon conversion activity such as olefin polymerization activity. The second step of the present process, namely, the treatment of the over-calcined material with additional phosphoric acid followed by calcination at a temperature of 500° to 900° F. gives good catalytic activity to the material which also retains a high crushing strength, this crushing strength being much higher than that of a composite of a siliceous carrier and a phosphoric acid prepared by a single mixing and calcination treatment, the latter calcination being carried out at a temperature of 500° to 900° C. which results in good catalytic activity but inferior catalyst strength and accordingly of short catalyst life.

A catalyst prepared by the process of this invention is active for promoting polymerization of olefinic hydrocarbons, particularly normally gaseous olefinic hydrocarbons, to form normally liquid hydrocarbons suitable for use as constituents of gasoline. When employed in the conversion of olefinic hydrocarbons into polymers, the calcined catalyst formed as herein set forth, is preferably employed as a granular layer in a heated reactor, which is generally made from steel, and through which the preheated hydrocarbon fraction is directed. Thus the solid catalyst of this process may be employed for treating mixtures of olefin-containing hydrocarbon vapors to effect olefin polymerization, but this same catalyst may also be used at operating conditions, suitable for maintaining liquid phase operation during polymerization of olefinic hydrocarbons, such as butylenes, to produce gasoline fractions. Thus when employed in the polymerization of normally gaseous olefins, the formed and calcined catalyst particles are generally placed in a vertical, cylindrical treating tower, and the olefin-containing gas mixture is passed downwardly therethrough at a temperature of from about 350° to about 550° F. and at a pressure of about 100 to about 1500 pounds per square inch when dealing with olefin-containing materials such as stabilizer reflux which may contain from approximately 10 to 50% or more of propylene and butylene. When operating on a mixture comprising essentially butanes and butylenes, this catalyst is effective at conditions favoring the maximum utilization of both normal butylenes and isobutylene which involves mixed polymerization at temperatures of from approximately 250° to about 325° F. and at pressures of from about 500 to about 1500 pounds per square inch.

In utilizing the catalysts of this invention for promoting miscellaneous organic reactions, the catalysts may be employed in essentially the same way as they are used when polymerizing olefins, in case the reactions are essentially vapor phase and they may be employed, in suspension, also in liquid phase in various types of equipment.

With suitable modifications in the details of operation, the present type of catalyst may be employed in a large number of organic reactions, including polymerization of olefins as already mentioned. Typical cases of reaction in which the present type of catalyst may be used are the alkylation of cyclic compounds with olefins, the cyclic compounds including aromatics, polycyclic compounds, naphthenes, and phenols; condensation reactions such as those occurring between ethers and aromatics, alcohols and aromatics, phenols and aldehydes, etc.; reactions involving the hydro-halogenation of unsaturated organic compounds, isomerization reactions, ester formation by the interaction of carboxylic acids and olefins and the like. The specific procedure for utilizing the present type of catalyst in miscellaneous organic reactions will be determined by the chemical and physical characteristics and the phase of the reacting constituents.

During use of these catalysts in vapor phase polymerization and other vapor phase treatments of organic compounds, it is often advisable to add small amounts of moisture to prevent excessive dehydration and subsequent decrease in catalyst activities. In order to substantially prevent loss of water from the catalyst an amount of water or water vapor such as steam is added to the charged olefin-containing gas so as to substantially balance the vapor pressure of the catalyst. This amount of water vapor varies from about 0.1 to about 6% by volume of the organic material charged.

Briefly the process for making a solid catalyst according to this invention comprises mixing from about 25 to about 75% by weight of an oxygen acid of phosphorus with from about 75 to about 25% by weight of a siliceous adsorbent to form a composite, shaping said composite into particles, calcining said particles at a temperature of from about 900° to about 1100° F. for a time of from about 1 to about 20 hours to form calcined particles, impregnating said calcined particles by adding thereto from about 5 to about 50% of their weight of an oxygen acid of phosphorus to form phosphoric acid coated particles and calcining said phosphoric acid coated particles at a temperature of from about 500° to about 900° F. for a time sufficient to form particles of high structural strength and good activity for promoting hydrocarbon conversion reactions and particularly conversion reactions involving olefins.

The following examples of the preparation of catalyst comprised within the scope of this invention and results obtained in their use for catalyzing the polymerization of propylene are characteristic, although the exact details set forth in these examples are not to be construed as imposing undue limitations upon the generally broad scope of the invention.

70 parts by weight of a polyphosphoric acid consisting mainly of pyrophosphoric acid and triphosphoric acid and having a $P_2O_5$ content of 80% was heated to a temperature of 340° F. and mixed by stirring with 30 parts by weight of diatomaceous earth having a volatile matter content of about 10% by weight. The resultant composite was then charged to an extrusion machine and formed by extrusion and cutting into cylindrical pieces 5 mm. in diameter and 5 mm. high. These cylindrical pieces were then submitted to a calcination operation at a temperature of 680° F. for a time of 1½ hours after which they were calcined in air for one hour at a temperature of 1040° F. These calcined particles had a polymerizing activity corresponding to 2% polymerization of the propylene from 100 grams of a propane-propylene mixture (53.3% propylene content) which was contacted with 10 grams of the catalyst for 2 hours at a temperature of 450° F. in a rotating steel autoclave. The catalyst had a crushing strength of 13.1 pounds before the polymerization test and 13.7 pounds after the polymerization test. These strength tests and the activity test show that the calcined composite had high structural strength but low propylene polymerizing activity. The remainder of the calcined particles similar to those subjected to the propylene polymerization test were then impregnated with an additional quantity of pyrophosphoric acid and orthophosphoric acid and then calcined further as indicated in the following table:

| | Calcined Composite | Calcined Composite $+H_4P_2O_7$ | | Calcined Composite $+H_3PO_4$ | |
|---|---|---|---|---|---|
| Calcination: | | | | | |
| ° F. | 1,040 | 680 | 860 | 680 | 860 |
| hours | 1 | 1 | 1 | 1 | 1 |
| Wt. before impregnation, grams | | 25.5 | 25.5 | 25.3 | 25.5 |
| Wt. after impregnation and calcination, grams | | 37.6 | 37.1 | 34.2 | 34.4 |
| Weight increase, per cent | | 47.2 | 45.4 | 35.2 | 34.9 |
| Total P as per cent $P_2O_5$ by preparation | 67.5 | 78 | 78 | 76 | 76 |
| Per cent Free $P_2O_5$ | 2.1 | 23.5 | 19.2 | 19.7 | 17.7 |
| Per cent Conversion propylene | 1.9 | 42.0 | 34.1 | 37.2 | 35.5 |
| Crushing strength— | | | | | |
| before test | 13.1 | 16.0 | 16.4 | 15.3 | 18.2 |
| after propylene test | 13.7 | 12.5 | 15.4 | 11.9 | 14.2 |

I claim as my invention:

1. A process for manufacturing a solid catalyst which comprises mixing an oxygen acid of phosphorus with a siliceous adsorbent to form a composite, calcining said composite at a temperature of from about 900° F. to about 1100° F. to form a solid calcined composite, impregnating said calcined composite with an oxygen acid of phosphorus to form a phosphoric acid coated composite, and calcining said phosphoric acid coated composite at a temperature below about 900° F. to form a structurally strong catalytic material having high hydrocarbon conversion activity.

2. A process for manufacturing a solid catalyst which comprises mixing an oxygen acid of phosphorus with a siliceous adsorbent to form a composite, shaping said composite into particles, calcining said particles at a temperature of from about 900° F. to about 1100° F. to form calcined particles, impregnating said calcined particles with an oxygen acid of phosphorus to form phosphoric acid coated particles and calcining said phosphoric acid coated particles at a temperature below about 900° F. to form structurally strong particles with high catalytic activity for promoting hydrocarbon conversion reactions.

3. A process for manufacturing a solid catalyst which comprises mixing from about 25 to about 75% by weight of an oxygen acid of phosphorus with from about 75 to about 25% by weight of a siliceous adsorbent to form a composite, calcining said composite at a temperature from about 900° to about 1100° F. for a time of from about 1 to about 20 hours to form a solid calcined composite, impregnating the calcined composite with from about 5 to about 50% by weight of an oxygen acid of phosphorus to form a phosphoric acid coated composite, and calcining said phosphoric acid coated composite at a temperature of from about 500° to about 900° F. to form a structurally strong material with high activity as catalyst in hydrocarbon conversion reactions.

4. A process for manufacturing a solid catalyst which comprises mixing from about 25 to about 75% by weight of an oxygen acid of phosphorus with from about 75 to about 25% by weight of a siliceous adsorbent at a temperature of from about 50° to about 450° F. to form a composite, calcining said composite at a temperature of from about 900° to about 1100° F. for a time of from about 1 to about 20 hours to form a calcined composite, impregnating the calcined composite with from about 5 to about 50% by weight of an oxygen acid of phosphorus to form a phosphoric acid coated composite, and calcining said phosphoric acid coated composite at a temperature of from about 500° to about 900° F. to form a structurally strong material with high activity as catalyst in hydrocarbon conversion reactions.

5. A process for manufacturing a solid catalyst which comprises mixing from about 25 to about 75% by weight of an oxygen acid of phosphorus from about 75 to about 25% by weight of a siliceous adsorbent to form a composite, shaping said composite into particles, calcining said particles at a temperature of from about 900° to about 1100° F. for a time of from about 1 to about 20 hours to form calcined particles, impregnating said calcined particles with from about 5 to about 50% of their weight of an oxygen acid of phosphorus to form phosphoric acid coated particles, and calcining said phosphoric acid coated particles at a temperature of from about 500° to about 900° F. to form structurally strong particles with high activity as catalyst in hydrocarbon conversion reactions.

6. A process for manufacturing a solid catalyst which comprises mixing from about 25 to about 75% by weight of an oxygen acid phosphorus with from about 75 to about 25% by weight of a siliceous adsorbent at a temperature of from about 50° to about 450° F. to form a composite, shaping said composite into particles, calcining said particles at a temperature of from about 900° to about 1100° F. for a time of from about 1 to about 20 hours to form calcined particles, impregnating said calcined particles with from about 5 to about 50% of their weight of an oxygen acid of phosphorus to form phosphoric acid coated particles, and calcining said phosphoric acid coated particles at a temperature of from about 500° to about 900° F. to form structurally strong particles with high activity as catalyst in hydrocarbon conversion reactions.

7. A process for manufacturing a solid catalyst which comprises mixing a polyphosphoric acid and diatomaceous earth to form a composite, shaping said composite into particles, calcining said particles at a temperature of from about 900° F. to about 1100° F. to form calcined particles, impregnating said calcined particles with an oxygen acid of phosphorus to form phosphoric acid coated particles, and calcining said phosphoric acid coated particles at a temperature below about 900° F. to form structurally strong particles with high catalytic activity for promoting hydrocarbon conversion reactions.

JULIAN M. MAVITY.

REFERENCES CITED

The following references are of record in the file of this patent:

UNITED STATES PATENTS

| Number | Name | Date |
|---|---|---|
| 2,275,182 | Ipatieff et al. | Mar. 3, 1942 |
| 2,324,079 | Greger | July 13, 1943 |
| 2,347,955 | Redondo | May 2, 1944 |
| 2,355,868 | Jean | Aug. 15, 1944 |
| 2,394,678 | Frankel et al. | Feb. 12, 1946 |
| 2,415,951 | Kirkbride et al. | Feb. 18, 1947 |
| 2,496,621 | Deery | Feb. 7, 1950 |